United States Patent
Rochberger et al.

(10) Patent No.: US 6,205,146 B1
(45) Date of Patent: Mar. 20, 2001

(54) METHOD OF DYNAMICALLY ROUTING TO A WELL KNOWN ADDRESS IN A NETWORK

(75) Inventors: Haim Rochberger, Netanya; Sarit Shani, Tel Aviv; Meir Morgenstern, Or Yehuda; David Margulis, Haifa, all of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/086,423

(22) Filed: May 28, 1998

(51) Int. Cl.$^7$ .................................................. H04L 12/28
(52) U.S. Cl. ........................... 370/395; 370/254; 370/16; 709/238; 709/239
(58) Field of Search ..................................... 370/387, 395, 370/238, 255, 254, 256, 408, 466, 399, 389, 352, 410, 252, 329, 336; 709/239, 203, 218, 249, 225, 217, 224, 238

(56) References Cited

U.S. PATENT DOCUMENTS

| | | | |
|---|---|---|---|
| 5,291,477 | 3/1994 | Liew ........................................ 370/54 |
| 5,361,256 | 11/1994 | Doeringer et al. ...................... 370/60 |
| 5,420,862 | 5/1995 | Perlman ........................... 370/85.13 |
| 5,455,865 | 10/1995 | Perlman ................................. 380/49 |
| 5,483,536 | 1/1996 | Gunji et al. ........................ 370/85.14 |
| 5,491,690 | 2/1996 | Alfonsi et al. .......................... 370/60 |
| 5,495,479 | 2/1996 | Galaand et al. ....................... 370/60 |
| 5,544,327 | 8/1996 | Dan et al. .............................. 395/250 |
| 5,550,818 | 8/1996 | Brackett et al. ....................... 370/60 |
| 5,566,014 | 10/1996 | Glance ................................. 359/124 |
| 5,590,118 | 12/1996 | Nederlof ............................... 370/218 |
| 5,600,638 | 2/1997 | Bertin et al. .......................... 370/351 |
| 5,603,029 | 2/1997 | Aman et al. .......................... 395/675 |
| 5,629,930 | 5/1997 | Beshai et al. ........................ 370/396 |
| 5,649,108 | 7/1997 | Spiegel et al. .................. 395/200.12 |
| 5,673,263 | 9/1997 | Basso et al. .......................... 370/396 |
| 5,729,685 | * 3/1998 | Chatwani et al. .................... 370/254 |
| 5,805,805 | * 9/1998 | Civanlar et al. ...................... 370/409 |
| 5,835,481 | * 11/1998 | Akyol et al. .......................... 370/216 |
| 5,892,912 | * 4/1999 | Suzuki et al. ........................ 370/395 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Alogorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

(List continued on next page.)

*Primary Examiner*—Wellington Chin
*Assistant Examiner*—Prenell Jones
(74) *Attorney, Agent, or Firm*—Howard Zaretsky; David J. Weitz; Wilson Sansoni Goodrich & Rosati

(57) ABSTRACT

A method of determining an efficient route to a well known address that is particularly applicable to networks that do not have the capability of source routing for calculating routes to specific addresses such as ATM networks based on the IISP protocol. The well known address may represent any entity in the network that provides distributed services (e.g., network server applications) that are to be shared among many nodes and applications on the network, such as LECSs. The method of functions to automatically and dynamically register 'well known' addresses on the ports of each node that implements the invention. This permits applications on the network to route to the destination in the shortest possible path thus utilizing network resources in an efficient manner. If there is more than one location with the well known address, e.g., a redundant LECSs in the network, or more than one route to the location then the optimum location will be the one routed to. An optimum location can be determined using any suitable criteria to determine the optimum route to a LECS such as distance, hop count, cost function, link sum, link capacity, etc.

13 Claims, 7 Drawing Sheets

OTHER PUBLICATIONS

Williams, K. A., "A Distributed ATM Network Based on an Optical Passive Star", printed from website http://williams.cs.ncat.edu/ATMStar.htm, 2 pages, (1998).

"All –optical ATM–Switch based on Self Electro–optic Effect Devices (SEED's)", printed from website http://www.stw.nl/projecten/T/tel3997.html, 2 pages, Feb. 2, 1997.

* cited by examiner

METHOD OF DYNAMICALLY ROUTING TO A WELL KNOWN ADDRESS IN A NETWORK

FIELD OF THE INVENTION

The present invention relates generally to data communication networks and more particularly relates to a method of dynamically routing to a well known address in a network.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

LAN Emulation

Today, most data traffic in existing customer premise networks travels over legacy LANs. It is desirable to permit these legacy LANs and their embedded infrastructure to operate with new ATM networks currently being deployed. To enable an easier migration path to ATM, the ATM Forum has defined LAN Emulation (LANE) specification which allows ATM networks to coexist with legacy systems. The LANE specification defines a way for an ATM network to emulate a logical Ethernet or Token Ring segment, these currently being the most popular LAN technologies.

LANE service provides connectivity between ATM capable devices and legacy LAN capable devices across an ATM network. Since LANE connectivity is defined at the MAC layer, the upper protocol layer functions of LAN applications can continue to function unchanged after the device joins an emulated LAN. This important feature protects corporate investments in legacy LAN applications. An ATM network can support multiple independent emulated LAN (ELAN) networks. A network may have one or more emulated LANs wherein each emulated LAN is separate and distinct from the others. Emulated LANs communicate via routers and bridges just as they do in physical LANs. The emulated LAN provides communication of user data frames between its users just as in an actual physical LAN.

Emulation over ATM networks, the LANE Version 1.0 standard drafted by the ATM Forum and incorporated herein by reference, defines the LANE architecture and a set of protocols used by the LANE entities. LANE uses a client/server model to provide its services. A diagram illustrating an example ATM network having a plurality of nodes, LESs, LECSs and LECs. is shown in FIG. 1. The network, generally referenced 10, comprises an ATM network cloud 19 which includes a plurality of nodes 12 connected by one or more links. A plurality of LECs 14 labeled LEC #1 through LEC #4 are connected to the switches. A plurality of LESs 16 labeled LES #1 and LES #2 are connected to switches. In addition, a plurality of LECS 18 labeled LECS #1 and LECS #2 are also connected to switches.

The entities defined by the LANE architecture include LAN Emulation Clients (LECs), a LAN Emulation Server (LES), a Broadcast and Unknown Server (BUS) and LAN Emulation Configuration Server (LECS). The LES, BUS and LECS constitute what is known to as the LANE Service.

The LAN Emulation Clients (LECs) represent a set of users, as identified by their MAC addresses. A LEC emulates a LAN interface that communicates with higher layer protocols such as IP, IPX, etc. that are used by these users. To achieve this task, the LEC communicates with the LANE Services and to other LECs. LECs communicate with each other and to the LANE Services via ATM Virtual Channel Connections (VCCs). The VCCs are typically Switched Virtual Circuits (SVCs), but Permanent Virtual Connections (PVCs) might also be used for this purpose.

In order for a LEC to participate in an emulated LAN, the LEC must first communicate with an LECS. It may utilize a specific ATM address of the LECS if it knows it, or, as typically the case, may use the well known address of the LECS to establish communications.

As described previously, the LANE Service comprises several entities: LANE Server (LES), a Broadcast and Unknown Server (BUS) and LAN Emulation Configuration Server (LECS). The LES provides Joining, Address Registration and Address Resolution services to the LECs. Note that a given LES serves only a single emulated LAN.

The LANE BUS is responsible for the distribution of the Broadcast, Multicast and unknown traffic to the LECs which it typically sent by a LEC before the ATM address has been resolved. Note that a given BUS serves only one emulated LAN.

The LECS contain the database used in determining which emulated LAN a device belongs to. Each LEC consults the LECS once, at the time it joins an emulated LAN, to determine which emulated LAN it should join. The LECS assigns the LEC to a given emulated LAN by giving the LEC the ATM address of the LES associated with that particular emulated LAN. Different policies may be utilized by the LECS in making the assignment. The assignment may be based on the LECs physical location, i.e., ATM address, the LEC ID, i.e., the MAC address, or any other suitable criteria. Note that the LECS serves all the emulated LANs defined for the given administrative ATM network domain.

The straightforward implementation of the LANE Version 1.0 specification includes a single LECS for the entire administrative domain and a single LES per emulated LAN. A disadvantage of this implementation is that it suffers from a single point of failure for both the LECS and the LES. Failure of the LECS might take the entire network down while failure of the LES takes the entire emulated LAN down.

In these types of implementations, what happens is that when a LES fails, all the LECs connected to it try to rejoin the emulated LAN by connecting to the LECS. The LECS, however, assigns these LECs to the same non operative LES. The connection fails and the process continues endlessly.

The LANE Version 2.0 draft specification addresses the single point of failure problem for the ELAN by defining a distributed architecture for the LANE services. Since the clients (LECs) should be effected by the particular implementation used to provide the services, the ATM Forum decided to split the LANE specification into two sub specifications: (1) LAN Emulation User to Network Interface (LUNI) and (2) LAN Emulation Network to Network Interface (LNNI).

The LUNI specification defines the interface between the LEC and the LANE Services and between the LEC and other LECs. The LNNI specification defines the interface between LANE Services entities, i.e., LECs, LESs, BUSs, etc.

In connection with the LNNI scheme, there may be several LECSs defined per administrative ATM domain in addition to several active LESs defined per ELAN. Each LECS maintains the list of currently active LESs. In case a LES fails, a mechanism is defined to ensure that all the LECSs are notified of the failure in order that none of the LECS assign LECs to non operational LESs. All the LECs previously connected to the failed LES are re-assigned by the LECS to other active LESs.

In the draft Version 2.0 of the LANE standard, the services include having multiple LES with each LES having multiple ELANs. The LECs (clients) are apportioned across the LESs. Redundancy is handled by defining several LESs for the same ELAN, i.e., LES #1, LES #2, etc. The prior art redundancy method is described in connection with FIG. 2 which illustrates a portion of an example prior art Emulated LAN having a plurality of LECSs, LECs and LESs. The Emulated LAN, generally referenced 30, comprises LECSs 18 labeled LECS #1 and LECS #2, LESs 16 labeled LES #1 and LES #2, BUSs 20 and LECs 14 labeled LEC #1, LEC #2 and LEC #3.

Via messages communicated among the LECS in the ELAN using the LNNI protocol, the LECSs know at all times the status of the LECSs in the ELAN, i.e., whether the LECS is currently up or down. In addition, each LECS maintains a list of currently active LESs. This provides redundancy for the ELAN in that when a LEC discovers that its LES failed, it goes to the LECSs which assigns the LEC to another LES. The LECS can assign the LEC to another LES since it has knowledge of which LESs are up or down.

A disadvantage to this approach is that it requires heavy protocols and supporting mechanisms to implement. The LNNI proposed model includes protocols between LESs, protocols between LECSs and protocols between LECSs and LESs. These protocols are necessary for (1) synchronization purposes, to insure that all the entities of the same type use the same database and for (2) distribution of LAN Emulation control frames between various entities. Note that the LNNI specification is currently scheduled to be standardized by the end of 1998.

In the distributed model of the LES service, there may be several active LESs per ELAN. An active LES is defined as a LES for which there is at least one LEC connected to it. As long as the subnetwork does not physically split into several subnetworks, the existence of more than one active LES is not valid in the non distributed implementation of the LES. The situation wherein more than one active LES is associated with an ELAN in a single subnetwork is called a split.

To provide redundancy a mechanism is required to synchronize of all the LECSs in the network. This requires additional complexity to be added to the network.

More specifically, in order for LANE to function properly, each LES must maintain a database of all LECs that have joined the ELAN. In the event one LES fails, another LES can take over the functions of the failed LES. Previously, with a single LES, no protocols or synchronization communications were necessary. With a distributed approach to redundancy, all LESs are required to exchange data and synchronize their databases via the LNNI protocol.

SUMMARY OF THE INVENTION

The present invention is a method of determining an efficient route to a well known address. The method is particularly applicable to networks that do not have the capability of source routing for calculating routes to specific addresses such as ATM networks based on the IISP protocol. The well known address may represent any entity in the network that provides distributed services (network server applications) that are to be shared among many nodes and applications on the network, such as LECSs.

To aid in understanding the principles of the present invention, an ATM network running the IISP protocol will be used as an example. The ATM network uses the well known address of the LAN Emulation Configuration Server (LECS) which, in the example provided herein, is implemented on an ATM switch. Alternatively, the LECS can also be implemented on an edge device as well. In addition, the ILMI protocol stack is used as an example for the protocol used between hops, i.e., hop to hop as opposed to end to end. One skilled in the art could readily apply the principles of the present invention to other types of networks and/or different protocols between two ports.

The method of the present invention functions to automatically and dynamically register 'well known' addresses on the appropriate ports. This permits applications on the network to route to the destination using the shortest possible path thus utilizing network resources in an efficient manner. If there is more than one location with the well known address, e.g., redundant LECSs in the network, or more than one route to the location then the optimum location will be the one routed to. Note that an optimum location can be determined using any suitable criteria to determine the optimum route to a LECS, e.g., distance, hop count, cost function, link sum, link capacity, etc.

There is provided in accordance with the present invention, in an Asynchronous Transfer Mode (ATM) network having a plurality of nodes, a network server application implemented on one of the nodes, a method of routing to a well known address, the method comprising the steps of sending an indication message containing a cost value on a periodic basis out on all Network to Network Interface (NNI) ports in the node that implements the network server application, receiving a message containing the cost value on a node, registering the well known address and a received cost value associated therewith on the port receiving the indication message if the well known address has not been previously registered, updating an existing cost value with the received cost value, incrementing the received cost value by one to yield a new cost value, forwarding an indication message containing the new cost value out on ports having a larger cost value registered therewith and on ports without a registered cost value if the received cost value is smaller than or equal to the smallest cost value associated with other NNI ports and routing a call request to the network server application, made by a user connected to a node, via the port with the smallest cost value associated therewith.

The network server application comprises a LAN Emulation Configuration Server (LECS). The cost value and the new cost value comprise a hop count and new hop count, respectively. The cost value and the new cost value comprise a cost function and new cost function, respectively. Also, the cost value and the new cost value comprise a link sum and new link sum, respectively.

The step of sending an indication message comprises the step of sending an Interim Local Management Interface (ILMI) trap message containing the cost value. The method further comprises the steps of resetting a timer associated with each port within each node when an indication message is received thereon and deleting the well known address associated with a particular port if the timer expires.

The network comprises a plurality of network server applications, the network server applications implemented on one or more nodes. The method further comprises the step of performing load sharing when routing the call request to the network server application in the event more than one port has a smallest cost value associated therewith.

There is also provided in accordance with the present invention, in an Asynchronous Transfer Mode (ATM) network having a plurality of nodes, a LAN Emulation Configuration Server (LECS) implemented one of the nodes, a method of routing to a well known address, the method comprising the steps of sending an indication message containing a hop count on a periodic basis out on all Network to Network Interface (NNI) ports in the node that implements the LECS, receiving a message containing the hop count on a node, registering the well known address and a received hop count associated therewith on the port receiving the indication message if the well known address has not been previously registered, updating an existing hop count with the received hop count, incrementing the received hop count by one to yield a new hop count, forwarding an indication message containing the new hop count out on ports having a larger hop count registered therewith and on ports without a registered hop count if the received cost value is smaller than or equal to the smallest hop count associated with other NNI ports and routing a call request to the LECS, made by a user connected to a node, via the port with the smallest hop count associated therewith.

The step of sending an indication message comprises the step of sending an Interim Local Management Interface (ILMI) trap message containing the cost value. The method further comprises the steps of resetting a timer associated with each port within each node when an indication message is received thereon and deleting the well known address associated with a particular port if the timer expires.

The method further comprises the step of performing load sharing when routing the call request to the network server application in the event more than one port has a smallest hop count associated therewith.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| BUS | Broadcast and Unknown Server |
| CCITT | Comite Consulatif International Telegraphique et Telephonique |
| FDDI | Fiber Distributed Data Interface |
| FSM | Finite State Machine |
| IE | Information Element |
| IISP | Interim Inter-Switch Signaling Protocol |
| ILMI | Interim Local Management Interface |
| IP | Internet Protocol |

-continued

| Term | Definition |
| --- | --- |
| ITU | International Telecommunications Union |
| LAN | Local Area Network |
| LANE | LAN Emulation |
| LEC | LAN Emulation Client |
| LECS | LAN Emulation Configuration Server |
| LES | LAN Emulation Server |
| LNNI | LAN Emulation Network to Network Interface |
| LUNI | LAN Emulation User to Network Interface |
| MAC | Media Access Control |
| NNI | Net to Network Interface |
| PNNI | Private Network to Network Interface |
| PTSE | PNNI Topology State Element |
| PTSP | PNNI Topology State Packet |
| PVC | Permanent Virtual Circuit |
| RCC | Routing Control Channel |
| SVC | Switched Virtual Circuit |
| SVCC | Switched Virtual Channel Connection |
| TLV | Type Length Value |
| UNI | User to Network Interface |
| VCC | Virtual Channel Connection |

General Description

The present invention is a method of determining an efficient route to a well known address. The well known address may represent any entity in the network that provides network server application services that are to be shared among nodes and applications on the network, such as LECSs.

The method of the present invention functions to automatically and dynamically register 'well known' addresses on the appropriate ports. This permits an application on the network to route to the destination using any suitable criteria to determine the optimum route, e.g., shortest possible path in terms of distance, hop count, cost function, link sum, link capacity, etc., thus utilizing network resources in an efficient manner. Using shortest distance as an example, if there is more than one location with the well known address, e.g., redundant LECSs in the network, or more than one route to the location then the closest location will be the one routed to.

Figure 1:
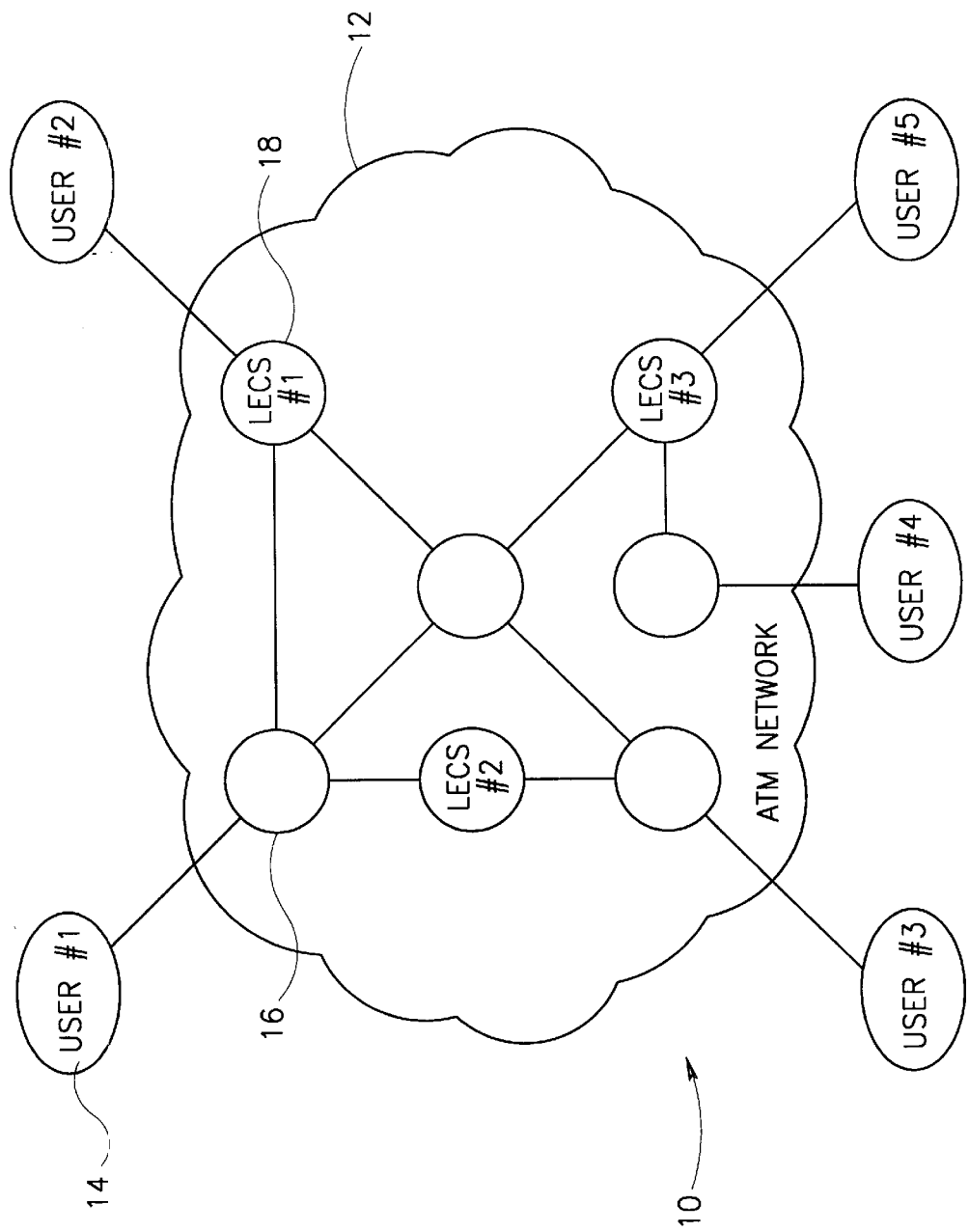
FIG. 1 is a diagram illustrating an example ATM network having a plurality of nodes whereby a portion of the nodes are LECSs.
Figure 2:
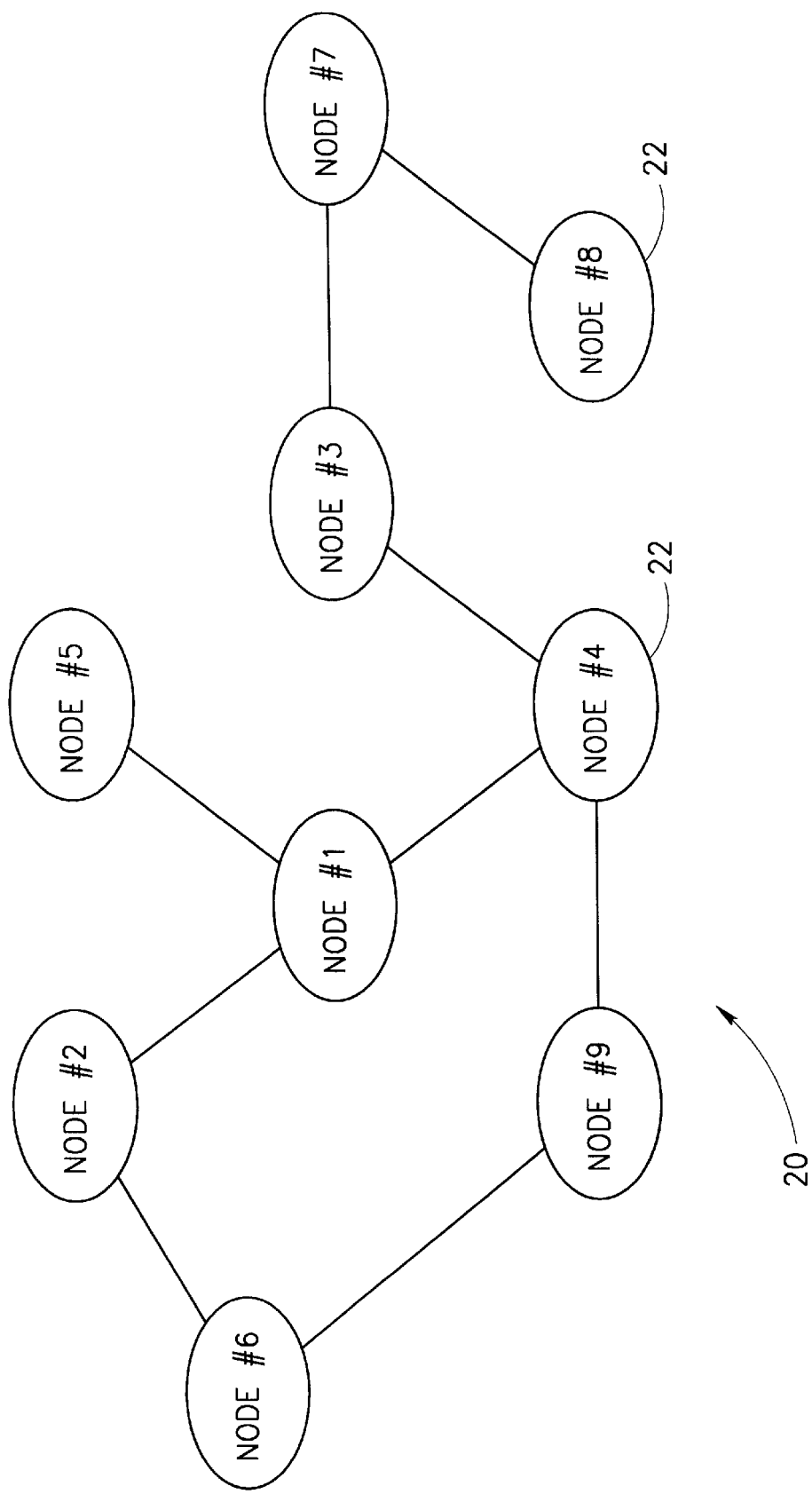
FIG. 2 is a diagram illustrating an example ATM network having a plurality of nodes whereby one of the nodes is a LECS.

A diagram illustrating an example ATM network having a plurality of nodes whereby one of the nodes is a LECS is shown in FIG. 2. The example network, generally referenced 20, comprises a plurality of ATM switch nodes 22 labeled node #1 through node #9. One of the ATM switch nodes, node #7, contains an LECS labeled LECS #1.

The method comprises a registration portion whereby each switch that implements a service with a well known address, e.g., the LECS service, periodically sends an indication containing a hop count to its neighbors. Note that a switch that implements a service has an address registered as a local address. In the example presented here, the indication can be sent via an ILMI message using an ILMI trap that has a private field assigned to indicate the hop count. Either a separate Type Length Value (TLV) field or an extension of an existing one may be used as the information element for this purpose. Alternatively, other SNMP type protocol messages/fields may be used. The indication may be sent periodically at any suitable rate such as every 30 or 60 seconds.

Thus, the node that implements the LECS #1, i.e., node #7, sends a message with the hop count indication having a value of 1 out on all its Network to Network Interface (NNI) ports. Each node that receives the indication stores the hop count in its database. If the hop count is the smallest one received until now, the node increments the hop count by one and sends it out on one or more NNI ports (as opposed to UNI ports) except for the port the message came in on.

If the well known address is not registered on the NNI port that the message came in on, then the node registers it and assigns the hop count to it. If the well known address is already registered to the NNI port, the existing hop count associated with the registered address is updated with the hop count just received.

If the received hop count is equal to or smaller than the smallest hop count received till now from among all the ports on the switch, then it is incremented and then sent out over the NNI ports that have a larger hop count associated with them and over any NNI ports that do not as yet have any hop counts registered therewith.

Further, each time a hop count message is received, a timer is reset which is used to age the hop count. When the timer expires, the well known address is deleted from the port.

Figure 3:
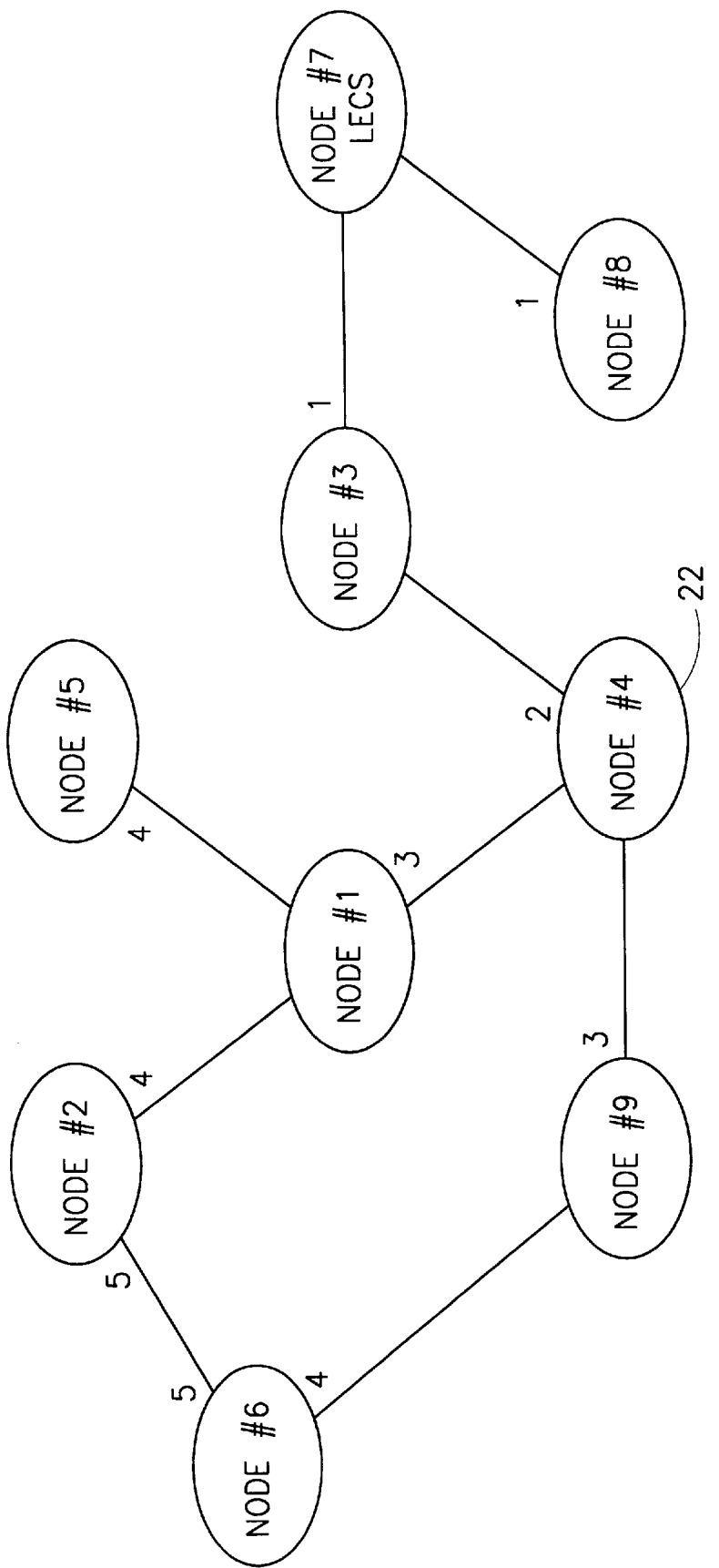
FIG. 3 is a diagram illustrating the example ATM network of FIG. 2 with the hop counts shown for each of the links between the nodes.

A diagram illustrating the example ATM network of FIG. 2 showing the hop counts associated with each of the links between the nodes is shown in FIG. 3. In accordance with the invention, each node in the network, generally referenced 20, increments the hop count and outputs a message on its ports resulting in the sample network in FIG. 3. Node #7 contains the network server application, e.g., LECS #1, and outputs a message with a hop count equal to 1 to its neighbors node #3 and node #8. Node #3, in turn, increments the hop count by one and outputs a message to node #4. Likewise, node #4 increments the hop count and outputs a message to node #1 and node #9. The process continues with node #6, node #5 and node #2.

Figure 4:
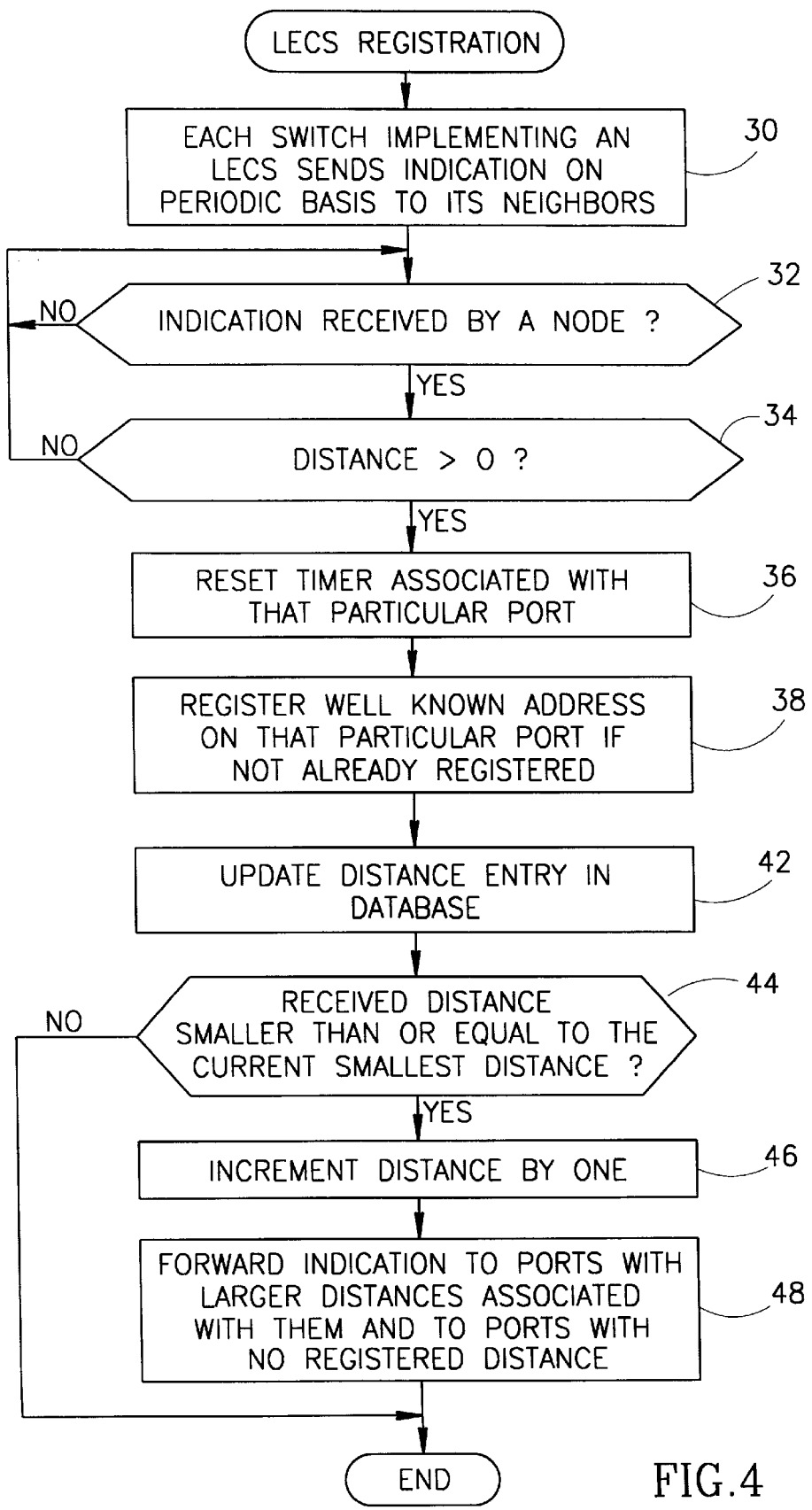
FIG. 4 is a flow diagram illustrating the LECS registration portion of the method of the present invention.

The method of the present invention will now be described in more detail. A flow diagram illustrating the LECS registration portion of the method of the present invention is shown in FIG. 4. Each switch (node) implementing a network server application such as a LECS sends an indication on a periodic basis, e.g., every 30, 60 or 90 seconds, to its neighbors (step 30). The indication contains a number representing the number of hops along the route from the receiving node to the LECS. The switch that implements the LECS will send an indication with a hop count of 1 out on all of its NNI ports.

When an indication is received by a node (step 32), it is checked whether the distance (hop count) is greater than 0 (step 34). An indication with a distance less then or equal to zero is ignored. If the distance is greater than zero then a timer associated with the port the indication message was received on is reset (step 36). The timer is used to age the indication, e.g., every 60 seconds. The well known address is then registered on that particular NNI port if it has not been already (step 38). Registering comprises assigning the hop count to the NNI port.

The new distance received in the indication message is registered in the node's database and is associated with that particular NNI port (step 42). It is then checked whether the received hop count is smaller than or equal to the smallest previously registered hop count among the other NNI ports (step 44). Note that more than one port in a node can have the same smallest hop count. If the received hop count is smaller than or equal to the smallest hop count previously received as compared with the other NNI ports, the hop count is incremented by one (step 46). An indication message is then generated and sent out on all NNI ports with larger hop counts associated with them and to all ports that do not as yet have a registered hop count (step 48). Thus, is this manner, each node in the network has knowledge of the distance from itself to a LECS.

To implement the method of the present invention each node must keep track of the minimum hop counts received on each port. Using the LECS as an example, a table may be maintained on each node for this purpose. Such a table may comprise the following columns: port number, LECS address, cost (i.e., distance or hop count), timer value.

The well known address may be handled in either of two ways: (1) the address may be placed in the table whereby a comparison on the address must be repeatably made looking for the well known address, or (2) the table may comprise one or more flags that are used to indicate that an address in the table is associated with a LECS. In both schemes, the distance from the LECS is also stored along with the well known address.

In the first case, every port in the table is scanned for the LECS address and, in turn, the distance is checked to find the minimum. In the second case, in routing a call to the LECS, the node can search for the port with the LECS flag set and having the smallest distance.

The present invention can be implemented wherein each node maintains one entry, i.e., no redundancy, or wherein a table containing a preference list is maintained, thus providing redundancy.

In the case wherein only one entry is maintained by the node, if an LECS is deleted or a connection cannot be established to it, the next preferred connection in the table is attempted. Note that load sharing among the LECS (or network server application) can be implemented among the ports in the event there is more than one port having the smallest hop count.

Note also, that the node with the LECS initializes its ports to zero distance. In addition, either (1) the node gets updated along with the other nodes or (2) the zeros remained untouched.

Figure 5:
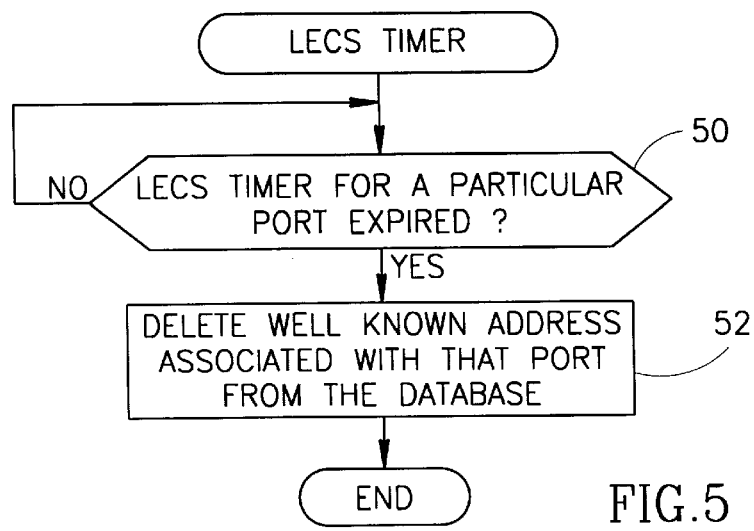
FIG. 5 is a flow diagram illustrating the LECS timer portion of the method of the present invention.

A flow diagram illustrating the LECS timer portion of the method of the present invention is shown in FIG. 5. As described previously, within each node, a timer associated with each port is reset when an indication message is received on a port. If the timer expires before a new indication message is received (step 50), then the well known address associated with that particular port is deleted from the database (step 52).

Figure 6:
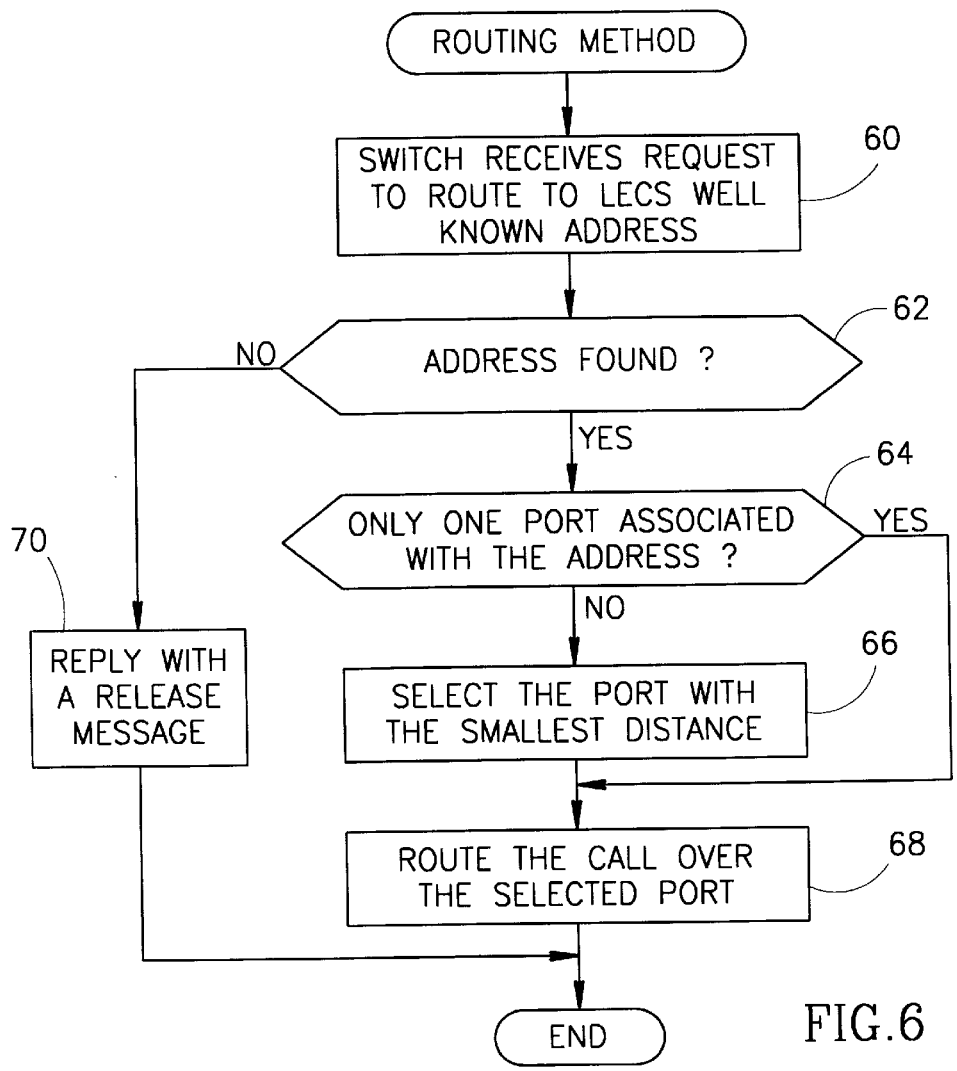
FIG. 6 is a flow diagram illustrating the LECS routing portion of the method of the present invention.

The routing portion of the method of the present invention will now be described in more detail. A flow diagram illustrating the LECS routing portion of the method of the present invention is shown in FIG. 6. Initially, a node receives a request from a user connected to it to route to a LECS well known address (step 60). If the well known address is not found in the node's routing database (step 62), a reply is generated consisting of a RELEASE message (step 70).

If the well known address is found, it is checked whether the well known address is associated with more than one NNI port (step 64). If the well known address is associated with only one port, the call to the LECS is routed over that port (step 68). If the well known address is associated with more than one port (step 64), the port with the smallest distance, i.e., hop count, associated with it is selected (step 66). The call to the LECS is then routed over that port (step 68). Note that, alternatively, criteria other then distance or hop count may be used to determine the best route to a LECS, e.g., cost function, link sum, link capacity, etc.

If there are more than one port with the same smallest number of hops associated with them, then the node can choose a port using a variety of different criteria. For example, the port could be chosen in a random fashion each time a call is to be made. Alternatively, load sharing among the ports could be performed by choosing the port using a round robin technique.

It is an important aspect of the present invention that the method presented herein implicitly handles the case of multiple network server applications, e.g., multiple LECSs. In accordance with the method, the shortest distance to the LECS is maintained by overwriting any previously stored hop count with hop counts received later in time.

As described previously, the method can be implemented wherein each node maintains one entry, i.e., no redundancy, or wherein a table containing a preference list is maintained, thus providing redundancy. An example of both is provided below wherein two LECSs are present in the network.

Figure 7:
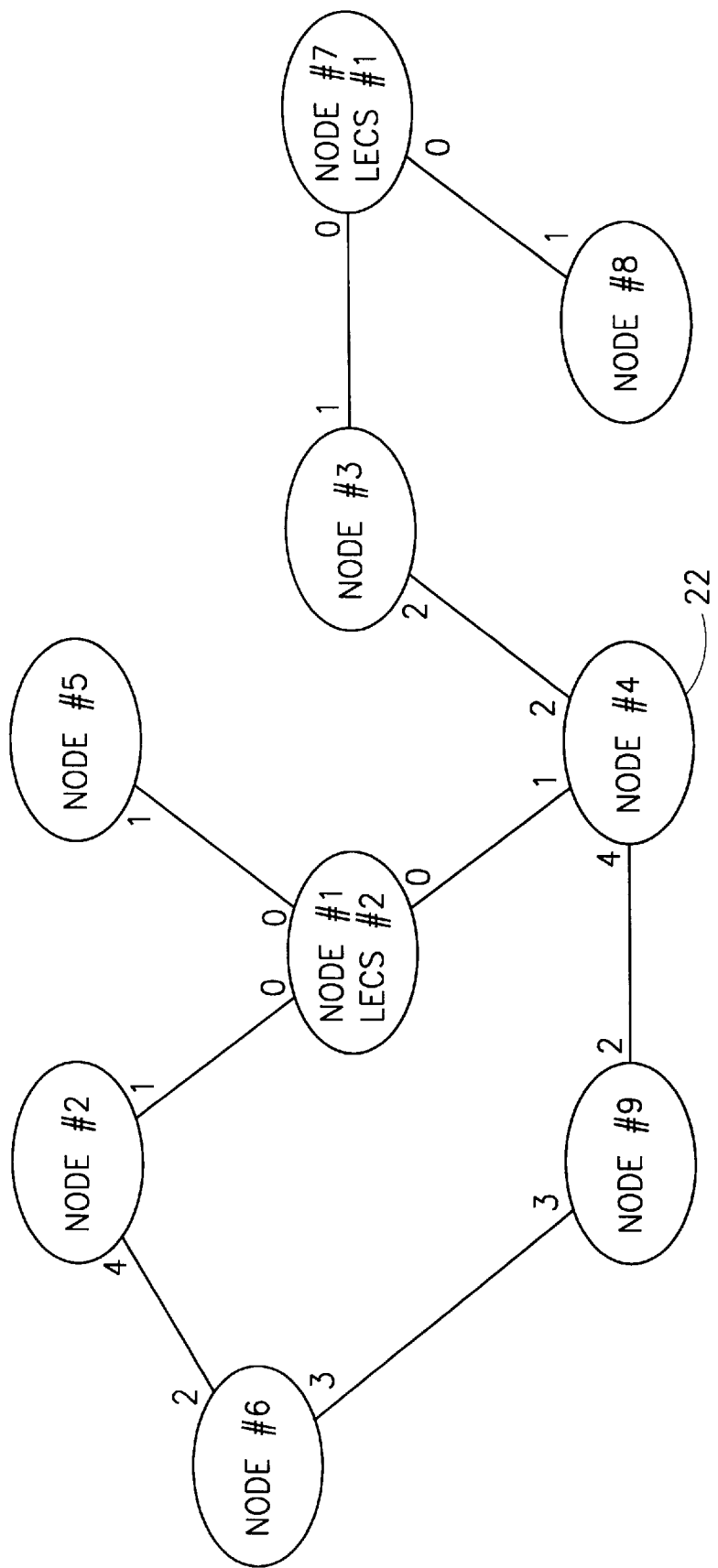
FIG. 7 is a diagram illustrating an example ATM network whereby two LECSs are present in the network and each node maintains a single entry for the well known address.

A diagram illustrating an example ATM network whereby two LECSs are present in the network and each node maintains a single entry for the well known address is shown in FIG. 7. The network, generally referenced 80, comprises a plurality of nodes 22 labeled node #1 though node #9. LECS #1 is located in node #7 and LECS #2 is present in node #1. The hop counts (distances) registered for each port on each node is indicated in FIG. 7.

In particular, the ports of each node implementing a LECS, i.e., node #1 and node #7, have a distance of zero registered on its NNI ports. Node #6 has one port to node #2 having a hop count of 2 while the port to node #9 has a hop count equal to 3 (i.e., to LECS #2). Node #2 has one port with a hop count equal to 4 and the other equal to 1. Thus, in routing a call to a LECS, node #2 will route to the port with the smallest distance, i.e., LECS #2 on node #2.

In this embodiment, on each node, when an indication message arrives with a new hop count, i.e., a second LECS comes on line or an existing LECS has somehow moved and is now at a larger distance then previously, the existing hop counts are overwritten with the new hop count. Note that the converse is true whereby a second LECS comes on line or an existing LECS has somehow moved and is now a shorter distance then it was previously. In this case too, the existing hop counts are overwritten with the new hop count.

Figure 8:
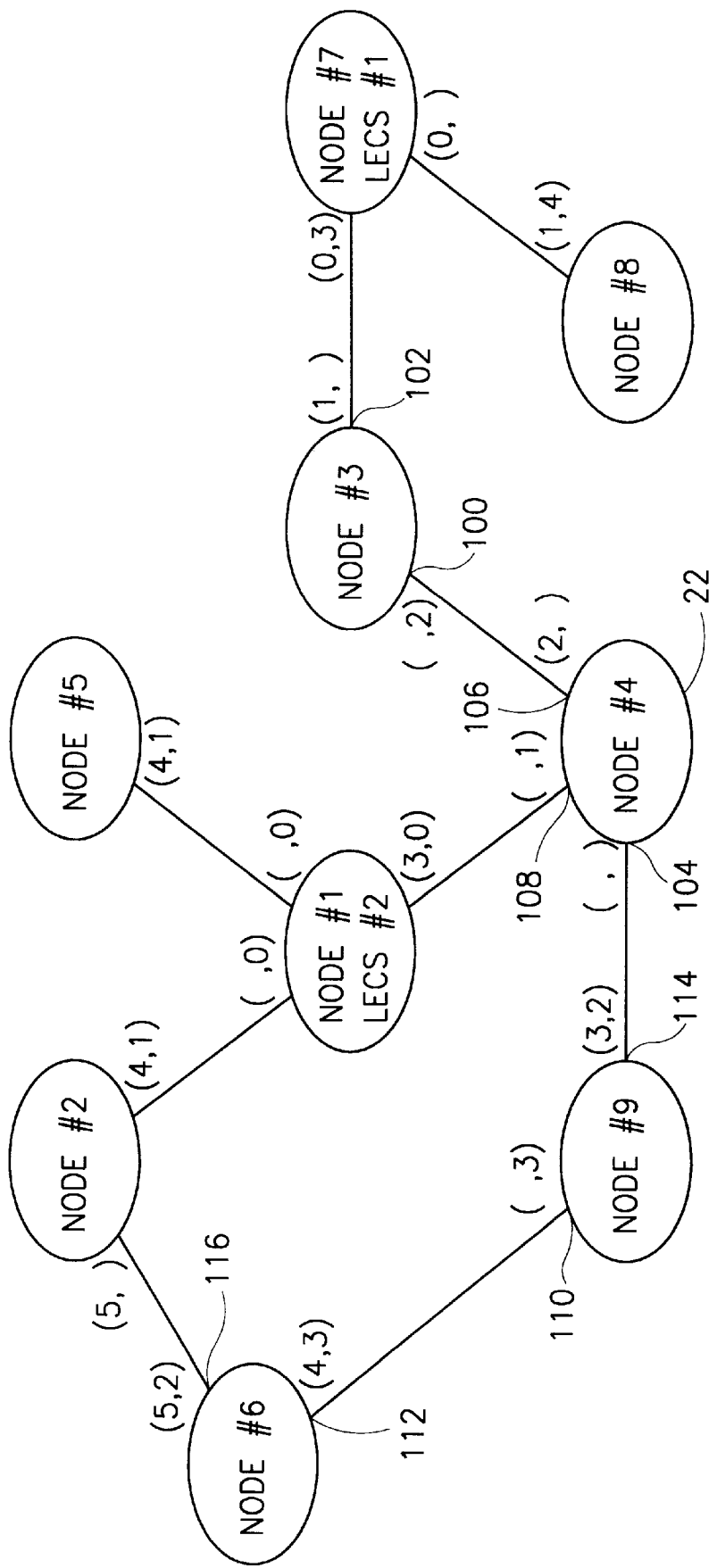
FIG. 8 is a diagram illustrating an example ATM network whereby two LECSs are present in the network and each node maintains a table of entries for the well known address.

A diagram illustrating an example ATM network whereby more then one LECS is present in the network and each node maintains a table of entries for the well known address is shown in FIG. 8. In this embodiment, the network, generally referenced 90, comprises a plurality of nodes 22 labeled node #1 through node #9. Two LECSs are implemented: LECS #1 on node 7 and LECS #2 on node #1. A table of preferences is maintained on each node wherein a hop count is maintained for each LECS for each port. Thus, each port has associated with it two numbers separated by a comma and enclosed within parenthesis in FIG. 8 next to each node for each link.

Some of the entries are absent because a hop count indication message will not be received on some of the ports. For example, port 100 on node #3 and ports 104, 108 on node #4 do not receive an indication message from LECS #1, thus their corresponding entries remain blank. Similarly, port 102 on node #3 and ports 104, 106 on node #4 do not receive an indication message from LECS #2,, thus their corresponding entries remain blank.

Port 116 on node #6 has hop count (5, 2) registered while port 112 on node #6 has hop count (4, 3) registered. After receiving a hop count of 5 on port 116, node #6 does not increment the hop count and sends it to node #9 since 5 is not smaller than or equal to 4 which is already registered on port 112, port 110 has no entry registered for LECS #1. Similarly, node #6 does not increment the hop count of 3 received on port 112 for LECS #2 and sends it to node #2 since a smaller hop count of 2 already is registered on port 116. Note that prior to reaching the steady state, some of the ports that currently do not have registered hop counts, may have had a hop count registered with them.

After the network stabilizes and the indication messages with the hop counts are propagated, each node can easily determine the shortest path to a LECS by finding the port with the smallest distance registered.

While the invention has been described with respect to a limited number of embodiments, it will be appreciated that many variations, modifications and other applications of the invention may be made.

What is claimed is:

1. In an Asynchronous Transfer Mode (ATM) network having a plurality of nodes, a network server application implemented on one of said nodes, a method of routing to a well known address, said method comprising the steps of:

sending an indication message containing a cost value on a periodic basis out on all Network to Network Interface (NNI) ports in the node that implements said network server application;

receiving a message containing said cost value on a node;

registering said well known address and a received cost value associated therewith on the port receiving said indication message if said well known address has not been previously registered;

updating an existing cost value with said received cost value;

incrementing said received cost value by one to yield a new cost value;

forwarding an indication message containing said new cost value out on ports having a larger cost value registered therewith and on ports without a registered cost value if said received cost value is smaller than or equal to the smallest cost value associated with other NNI ports; and routing a call request to said network server application, made by a user connected to a node, via the port with the smallest cost value associated therewith.

2. The method according to claim 1, wherein said network server application comprises a LAN Emulation Configuration Server (LECS).

3. The method according to claim 1, wherein said cost value and said new cost value comprise a hop count and new hop count, respectively.

4. The method according to claim 1, wherein said cost value and said new cost value comprise a cost function and new cost function, respectively.

5. The method according to claim 1, wherein said cost value and said new cost value comprise a link sum and new link sum, respectively.

6. The method according to claim 1, wherein said step of sending an indication message comprises the step of sending an Interim Local Management Interface (ILMI) trap message containing said cost value.

7. The method according to claim 1, further comprising the steps of:

resetting a timer associated with each port within each node when an indication message is received thereon; and deleting said well known address associated with a particular port if said timer expires.

8. The method according to claim 1, wherein said network comprises a plurality of network server applications, said network server applications implemented on one or more nodes.

9. The method according to claim 1, further comprising the step of performing load sharing when routing said call request to said network server application in the event more than one port has a smallest cost value associated therewith.

10. In an Asynchronous Transfer Mode (ATM) network having a plurality of nodes, a LAN Emulation Configuration Server (LECS) implemented one of said nodes, a method of routing to a well known address, said method comprising the steps of:

sending an indication message containing a hop count on a periodic basis out on all Network to Network Interface (NNI) ports in the node that implements said LECS;

receiving a message containing said hop count on a node;

registering said well known address and a received hop count associated therewith on the port receiving said indication message if said well known address has not been previously registered;

updating an existing hop count with said received hop count;

incrementing said received hop count by one to yield a new hop count;

forwarding an indication message containing said new hop count out on ports having a larger hop count registered therewith and on ports without a registered hop count if said received cost value is smaller than or equal to the smallest hop count associated with other NNI ports; and routing a call request to said LECS, made by a user connected to a node, via the port with the smallest hop count associated therewith.

11. The method according to claim 10, wherein said step of sending an indication message comprises the step of sending an Interim Local Management Interface (ILMI) trap message containing said cost value.

12. The method according to claim 10, further comprising the steps of:

resetting a timer associated with each port within each node when an indication message is received thereon; and deleting said well known address associated with a particular port if said timer expires.

13. The method according to claim 10, further comprising the step of performing load sharing when routing said call request to said network server application in the event more than one port has a smallest hop count associated therewith.

* * * * *